United States Patent
Force

[11] Patent Number: 5,448,958
[45] Date of Patent: Sep. 12, 1995

[54] AGRICULTURAL PLOW FOR TREATMENT AND/OR FIXING OF GASEOUS CONSTITUENTS

[76] Inventor: Eric R. Force, 8655 N. Scenic Dr., Tucson, Ariz. 85743

[21] Appl. No.: 131,006

[22] Filed: Oct. 4, 1993

[51] Int. Cl.6 .................................................. A01C 23/00
[52] U.S. Cl. .................................... 111/118; 111/126; 172/755
[58] Field of Search ................ 172/754, 755; 47/1.42, 47/1.44; 111/118, 126

[56] References Cited

U.S. PATENT DOCUMENTS

| | | | |
|---|---|---|---|
| 213,149 | 3/1979 | Tucker | 172/755 |
| 364,768 | 6/1887 | Oliver | 172/755 |
| 1,897,444 | 2/1933 | Stark | 172/755 |
| 1,927,177 | 9/1933 | Ledbetter | 172/755 |
| 3,180,432 | 4/1965 | Bertelsen | 172/755 |
| 3,834,330 | 9/1974 | Wallace | 111/126 |

*Primary Examiner*—Randolph A. Reese
*Assistant Examiner*—Frederick L. Lagman

[57] ABSTRACT

An apparatus that treats and/or fixes soil gases liberated during plowing. An upper portion of a plow blade comprises a detachable panel made from a catalyst metal and behind the detachable panel is an electric resistance heater. A compressed fluid hose and nozzle located proximate the upper portion of the plow blade supplies reactants which react with a soil gas in the presence of a catalyst and heat.

2 Claims, 4 Drawing Sheets

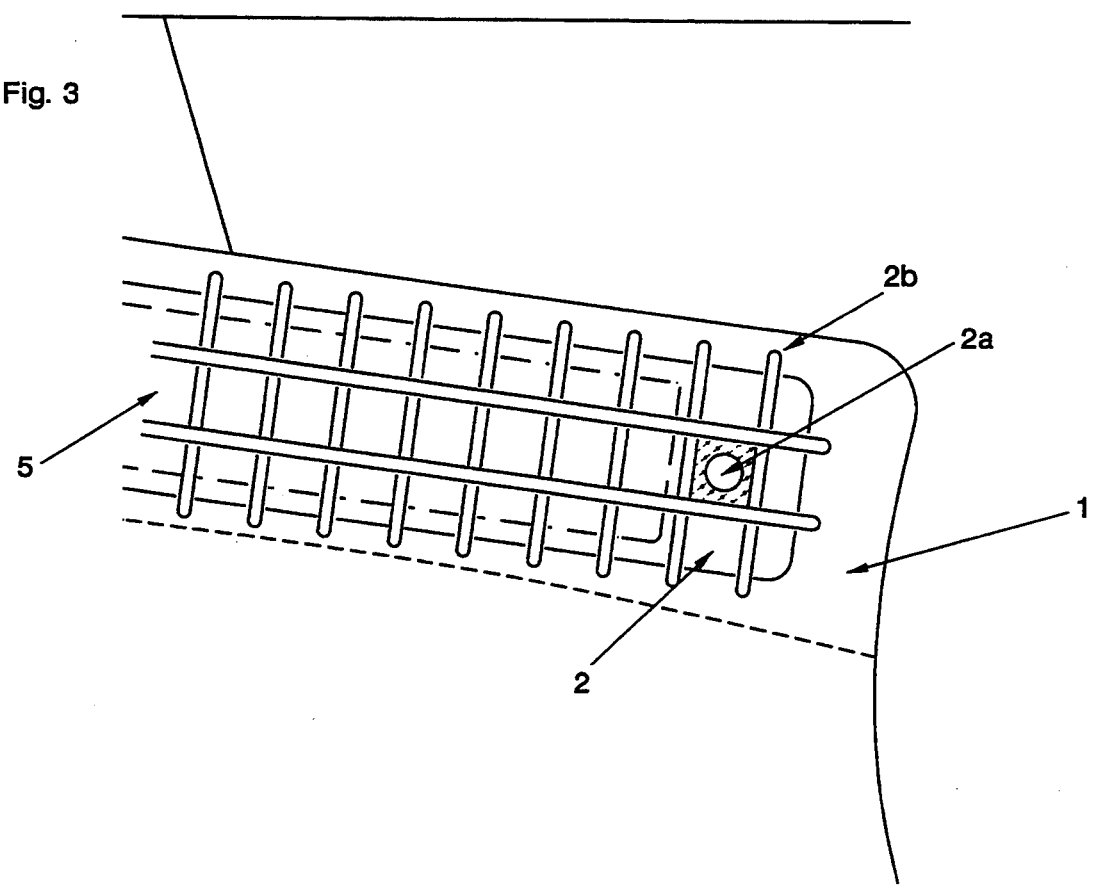

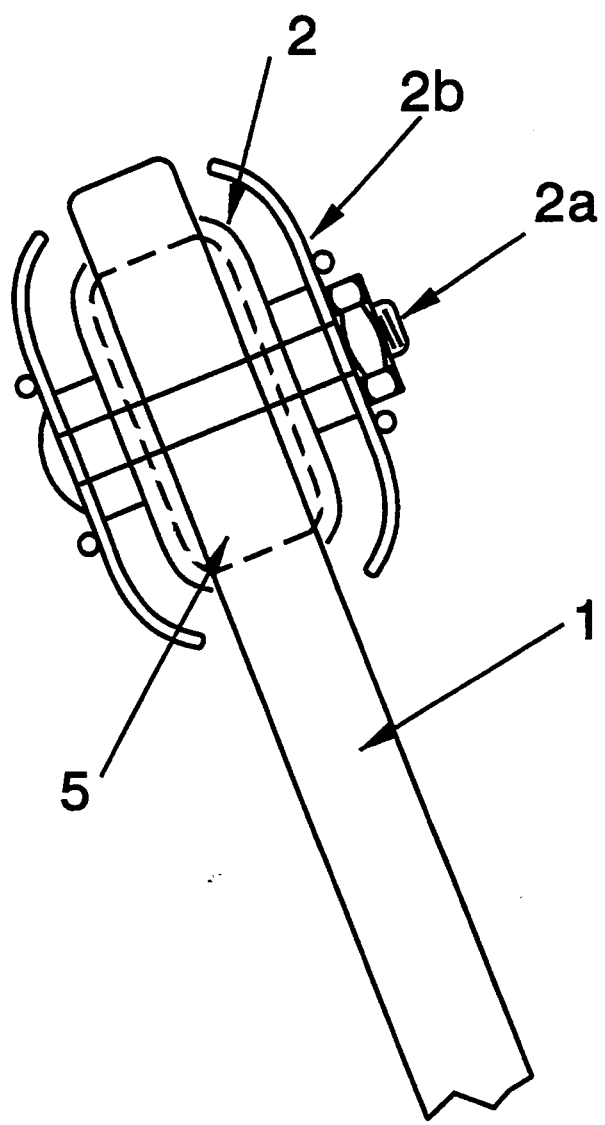

AGRICULTURAL PLOW FOR TREATMENT AND/OR FIXING OF GASEOUS CONSTITUENTS

BACKGROUND OF THE INVENTION

This invention relates to agricultural implements.

The purpose of the invention is to prevent the wastage of gaseous soil constituents that can be converted to useful substances, or to encourage evacuation and allow treatment of gaseous constituents that may be harmful. There is a need to take advantage of or otherwise manage all soil constituents, in order to maximize agricultural production without undue chemical pollution. Gaseous constituents of soils are commonly liberated by plowing; hence treatment or fixing concurrent with plowing is the most promising approach. No devices presently address the opportunity. In general, the application of heat, reactant fluids, and catalysts are required for such a device to operate.

SUMMARY OF THE INVENTION

This invention treats and/or fixes soil gases liberated during plowing. It consists of the following components, understood as additional components mounted on the frame of a set of tractor-drawn plows.

1. A plow blade in which the portion extending upward from the uppermost soil-contact surface consists of a detachable panel fashioned from any metal that functions as a catalyst, behind which is a thermostatically controlled electric resistance heater, powered by the electrical system of the tractor.
2. Compressed fluid fed via nozzles trained on these panels.

BRIEF DESCRIPTION OF THE DRAWING

FIGS. 3 and 4 show details of upper part of plow-blade in side and front view respectively.

DETAILED DESCRIPTION OF INVENTION

Figure 1:
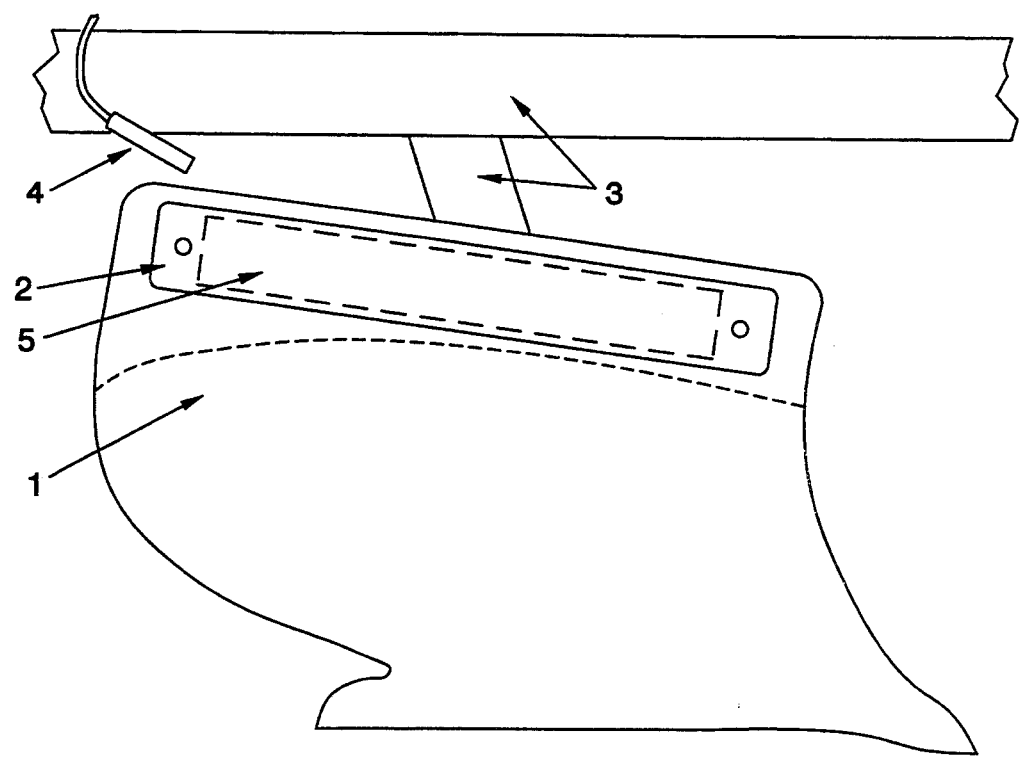
FIGS. 1 and 2 show the overall configuration of each plow-blade in side and front views, respectively.

Refer now to FIG. 1, which is an overall drawing of a preferred version of the invention from the side of the plow. Labelled item1 is the plow blade, showing the uppermost soil-contact surface (dotted). Item 2 is the catalyst panel. Item 3 shows elements of the frame of the plow. Item 4 is a compressed fluid hose and nozzle. Item 5 is a thermostatically controlled electric resistance heater (dashed) under the catalyst panel. Each blade mounted on the plow would carry these same pieces of equipment. If operation of the plow liberates soil gases, these can be fixed or treated by the application of fluids (item 4) in the presence of heat (item 5) and a catalyst (item 2) under controlled conditions.

Figure 2:
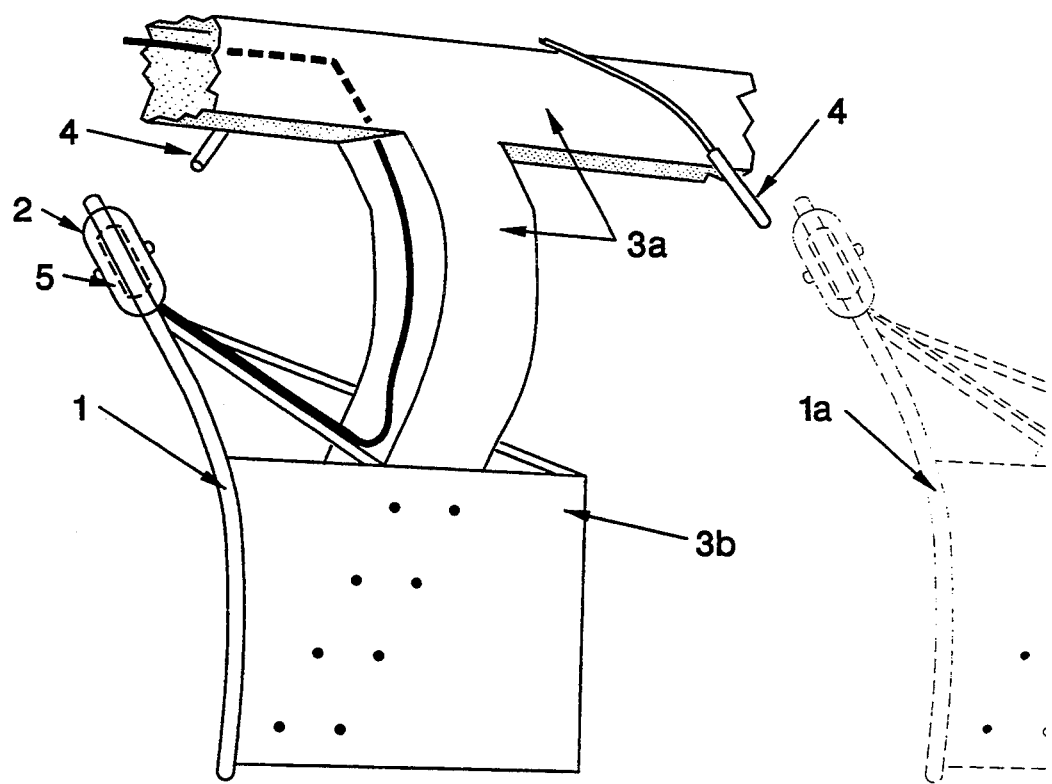

FIG. 2 shows the plow blade from the front along the blade. Item 1 is the blade; 1a is an adjacent blade. Item 2 is the catalyst panel. Item 3a is the frame; 3b is the frog and shin. Item 4 shows the compressed fluid hose and nozzle, one on the adjacent blade. Item 5 is the volume for the thermostatically controlled electric resistance heater, showing a route for covered wiring (heavy line) along frame and braces.

FIG. 3 shows a more detailed view of part of the upper portion of each plow blade in side view. Item1 is the plow-blade upper portion showing the uppermost soil-contact surface (short dashes). Item 2 is the catalyst panel showing mounts (2a) and a mesh guard (2b). Said panel may consist of magnesium or any other catalyst suitable metal. The mesh guard is to decrease the likelihood of agricultural trash coming in contact with the catalyst while allowing gases through. Items 3 and 4 are not shown in this view. Item 5 is the thermostatically controlled electric resistance heater (outline dashed) behind the catalyst panel.

FIG. 4 shows the same detail of the upper plow blade in cross-section from the front along the blade. Item 1 is the plow blade upper portion. Item 2 is the catalyst panel showing mounts (2a) and mesh guard (2b). Items 3 and 4 are not shown in this view. Item 5 is the thermostatically controlled electric resistance heater (outline dashed).

The fluid supplied via item 4 may simply be large volumes of air. The fluid may either be carried compressed in containers, or fed by a compressor or compressors powered by the tractor. Some soil-gas reactions are exothermic so that heat (item 5) is required mostly to begin the reaction (for example where methane is the main soil gas). Some plow-blade designs may be such that retrofit with the equipment of this invention is possible. The figures show a moldboard plow, which is believed to be most suitable for the invention, but the equipment could also be mounted on a chisel-type plow.

The foregoing description is for the purpose of illustration of a preferred version of the invention. It is not intended to be exhaustive, or to limit the invention to this precise form. Other possible modifications and variations are limited not by this description, but by the following claim.

I claim:

1. An assemblage of components in combination with a tractor-drawn plow, including means of providing reactant fluids to liberated soil gases, and of controlling the reaction with heat and catalysts, in order to treat or fix the gaseous constituents of soils, comprising:

a plow blade in which the portion extending above the soil,contact surface contains a detachable panel fashioned of a catalyst metal, behind which is a thermostatically controlled electric resistance heater, which together supply heat and catalysts to control the conditions under which a soil-gas reaction would occur, and a compressed fluid fed via nozzles trained on said panels, which supply reactants for such reaction.

2. The assemblage of claim 1 wherein the catalyst metal is magnesium.

* * * * *